United States Patent
Salter et al.

(10) Patent No.: US 11,760,249 B2
(45) Date of Patent: Sep. 19, 2023

(54) VEHICLE ASSIST HANDLE ASSEMBLY HAVING A DISPLAY

(71) Applicant: Ford Global Technologies, LLC, Dearborn, MI (US)

(72) Inventors: Stuart C. Salter, White Lake, MI (US); David Brian Glickman, Southfield, MI (US); Annette Lynn Huebner, Highland, MI (US); Jim Baumbick, Northville, MI (US); Paul Kenneth Dellock, Northville, MI (US); Robert J. Gelardi, Plymouth, MI (US); Daniel J. Martin, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 17/032,237

(22) Filed: Sep. 25, 2020

(65) Prior Publication Data
US 2022/0097582 A1   Mar. 31, 2022

(51) Int. Cl.
*B60N 3/02* (2006.01)
*B60K 35/00* (2006.01)
*B60R 11/02* (2006.01)

(52) U.S. Cl.
CPC ............. *B60N 3/02* (2013.01); *B60K 35/00* (2013.01); *B60R 11/0235* (2013.01); *B60K 2370/1438* (2019.05); *B60K 2370/589* (2019.05); *B60K 2370/774* (2019.05)

(58) Field of Classification Search
CPC ........ B60N 3/02; B60K 35/00; B60R 11/0235
See application file for complete search history.

(56) References Cited

U.S. PATENT DOCUMENTS

| 4,687,072 | A  | * | 8/1987  | Komuro .............. B62J 50/225 180/219 |
|-----------|----|---|---------|------------------------------------------|
| 6,431,643 | B2 |   | 8/2002  | Grey                                     |
| 7,270,359 | B2 |   | 9/2007  | Sparks et al.                            |
| 7,400,232 | B2 |   | 7/2008  | Reichling et al.                         |
| 7,661,704 | B2 |   | 2/2010  | Chen et al.                              |
| 8,690,402 | B2 |   | 4/2014  | Durkin et al.                            |
| 8,827,516 | B2 |   | 9/2014  | Stakoe et al.                            |
| 8,922,340 | B2 |   | 12/2014 | Salter et al.                            |
| 9,079,542 | B1 |   | 7/2015  | Ross et al.                              |
| 10,071,665| B2 |   | 9/2018  | Ibrahim et al.                           |
| 10,343,575| B1 |   | 7/2019  | Lynn et al.                              |
| 10,378,254| B1 |   | 8/2019  | Salter et al.                            |
| 10,457,183| B2 |   | 10/2019 | Frederick et al.                         |
| 10,604,079| B2 |   | 3/2020  | Lockwood et al.                          |
| 10,668,847| B2 |   | 6/2020  | Takenaka et al.                          |

(Continued)

FOREIGN PATENT DOCUMENTS

| DE | 102011112438 A1 | 3/2013 |
| DE | 102018221662 A1 | 6/2020 |
| FR | 2860823 A1 *    | 4/2005 |

*Primary Examiner* — David E Choi
(74) *Attorney, Agent, or Firm* — Vichit Chea; Price Heneveld LLP

(57) ABSTRACT

An assist handle assembly for use in an interior of a vehicle. The assist handle assembly includes an assist handle configured to be gripped by a user, a display connected to the assist handle, a communication link operatively coupled to the display, a connector configured to secure the assist handle assembly to a structural component in the interior of the vehicle.

17 Claims, 8 Drawing Sheets

(56) References Cited

U.S. PATENT DOCUMENTS

| | | | |
|---|---|---|---|
| 2001/0011836 A1* | 8/2001 | Grey | B60N 3/023 |
| | | | 296/214 |
| 2004/0145457 A1 | 7/2004 | Schofield et al. | |
| 2008/0018437 A1* | 1/2008 | Reichling | B60R 25/1001 |
| | | | 340/426.1 |
| 2008/0105483 A1* | 5/2008 | Dugas | B62J 27/00 |
| | | | 477/27 |
| 2012/0217928 A1* | 8/2012 | Kulidjian | B60L 3/0069 |
| | | | 307/131 |
| 2015/0199162 A1* | 7/2015 | Platz | G06F 3/0412 |
| | | | 701/1 |
| 2015/0330112 A1 | 11/2015 | Van Wiemeersch et al. | |
| 2017/0329438 A1* | 11/2017 | Kobel | B60Q 1/2669 |
| 2018/0096638 A1* | 4/2018 | Pacheco | G09F 23/00 |
| 2018/0147981 A1* | 5/2018 | Troeger | B60Q 3/267 |
| 2019/0061631 A1 | 2/2019 | Lockwood et al. | |
| 2019/0217776 A1* | 7/2019 | Sato | B60Q 3/267 |
| 2020/0331529 A1* | 10/2020 | Kawai | B60K 5/00 |
| 2022/0035156 A1* | 2/2022 | Helot | B60K 37/02 |
| 2022/0097582 A1* | 3/2022 | Salter | B60K 35/00 |

\* cited by examiner

VEHICLE ASSIST HANDLE ASSEMBLY HAVING A DISPLAY

FIELD OF THE DISCLOSURE

The present disclosure generally relates to assist handles, and more particularly relates to a vehicle assist handle assembly having an accessory.

BACKGROUND OF THE DISCLOSURE

Automotive vehicles are commonly equipped with handle structures referred to as passenger assist handles for passengers to grasp with their hand when entering and exiting the vehicle and during maneuvering of the vehicle. Assist handles can be particularly useful for off-road-style vehicles while driving on rough road conditions. In off-road style vehicles and other types of vehicles, it may be desirable to provide an accessory with the assist handle, particularly for customizable vehicle interiors.

SUMMARY OF THE DISCLOSURE

According to a first aspect of the present disclosure, an assist handle assembly for a vehicle is provided. The assist handle assembly for a vehicle includes an assist handle configured to be gripped by a user, a display connected to the assist handle, and a connector configured to secure the assist handle assembly to a structural component of the vehicle.

Embodiments of the first aspect of the disclosure can include any one or a combination of the following features:
- the connector is releasable to allow for assembly and disassembly of the assist handle assembly from the vehicle;
- a power cable for connecting to a vehicle power supply;
- the display comprises a touchscreen display;
- the display comprises a gauge display;
- a communication link;
- the communication link is configured to communicate with a controller onboard the vehicle;
- the communication link comprises a wireless communication link;
- the display extends vehicle forward of the assist handle when installed on the vehicle;
- the connector is configured to connect to a bracket in an interior portion of the vehicle;
- the assist handle comprises one or more proximity sensors; and
- the one or more proximity sensors comprises one or more capacitive sensors.

According to a second aspect of the present disclosure, an assist handle assembly for use in an interior of a vehicle is provided. The assist handle assembly for use in an interior of a vehicle includes an assist handle configured to be gripped by a user, a display connected to the assist handle, a communication link operatively coupled to the display, and a connector configured to secure the assist handle assembly to a structural component in the interior of the vehicle.

Embodiments of the second aspect of the disclosure can include any one or a combination of the following features:
- the connector is releasable to allow for assembly and disassembly of the assist handle assembly to the vehicle;
- a jumper harness for releasably connecting to a vehicle power supply;
- the display comprises a touchscreen display;
- the display comprises a gauge display;
- the communication link comprises a wireless communication link;
- the wireless communication link is configured to communicate with a controller onboard the vehicle; and
- the assist handle further comprises one or more proximity sensors.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
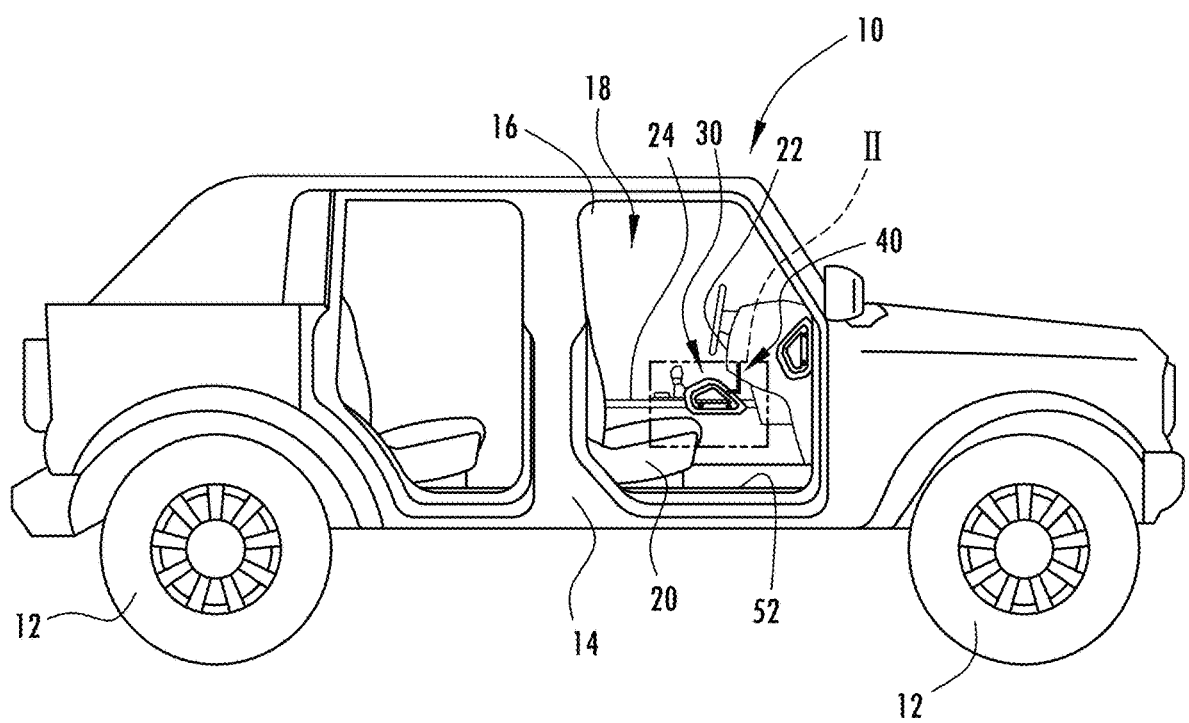
FIG. 1 is a side perspective view of a motor vehicle that is configured to include one or more assist handle assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle assist handle assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, a vehicle assist handle assembly 30 is illustrated having an assist handle assembly for a vehicle including an assist handle configured to be gripped by a user, a display connected to the assist handle, and a connector configured to secure the assist handle assembly to a structural component of the vehicle.

With particular reference to FIG. 1, a motor vehicle 10 is generally illustrated. The motor vehicle 10 is generally shown as an off-road style, wheeled vehicle that may be driven on a roadway or driven off-road on various types of terrain. The motor vehicle 10 generally includes a plurality of road wheels 12 and a vehicle body 14 generally defining a passenger compartment 18 with ingress/egress openings 16 which may be closed with doors. The doors may include hingedly connected door panels with windows or crossbars having exposed openings that may be fixedly installed or removable, according to various examples. While a wheeled vehicle is generally shown and described herein, it should be appreciated that other vehicles such as boats, trains, planes and other vehicles may be equipped with the assist handle assembly 30.

The motor vehicle 10 is configured to include one or more seats 20 for holding passengers seated within the passenger compartment 18 of the vehicle 10. In a typical passenger vehicle seating arrangement, a front row of bucket seats may include two seats spaced apart and the second row may have a bench seat configuration that may include a row of three seats or may include two seats separated by a rear center console. The front row seats 20 are generally rearward of a dashboard 22. A front center console 24 is shown located centrally within the front row of seats 20 between a driver seat and a passenger seat. The center console 24 may be configured with storage compartments, drink holders and other features. An assist handle assembly 30 is shown connected to the center console 24 proximate an upper side of a side wall 26, according to one embodiment.

Figure 2:
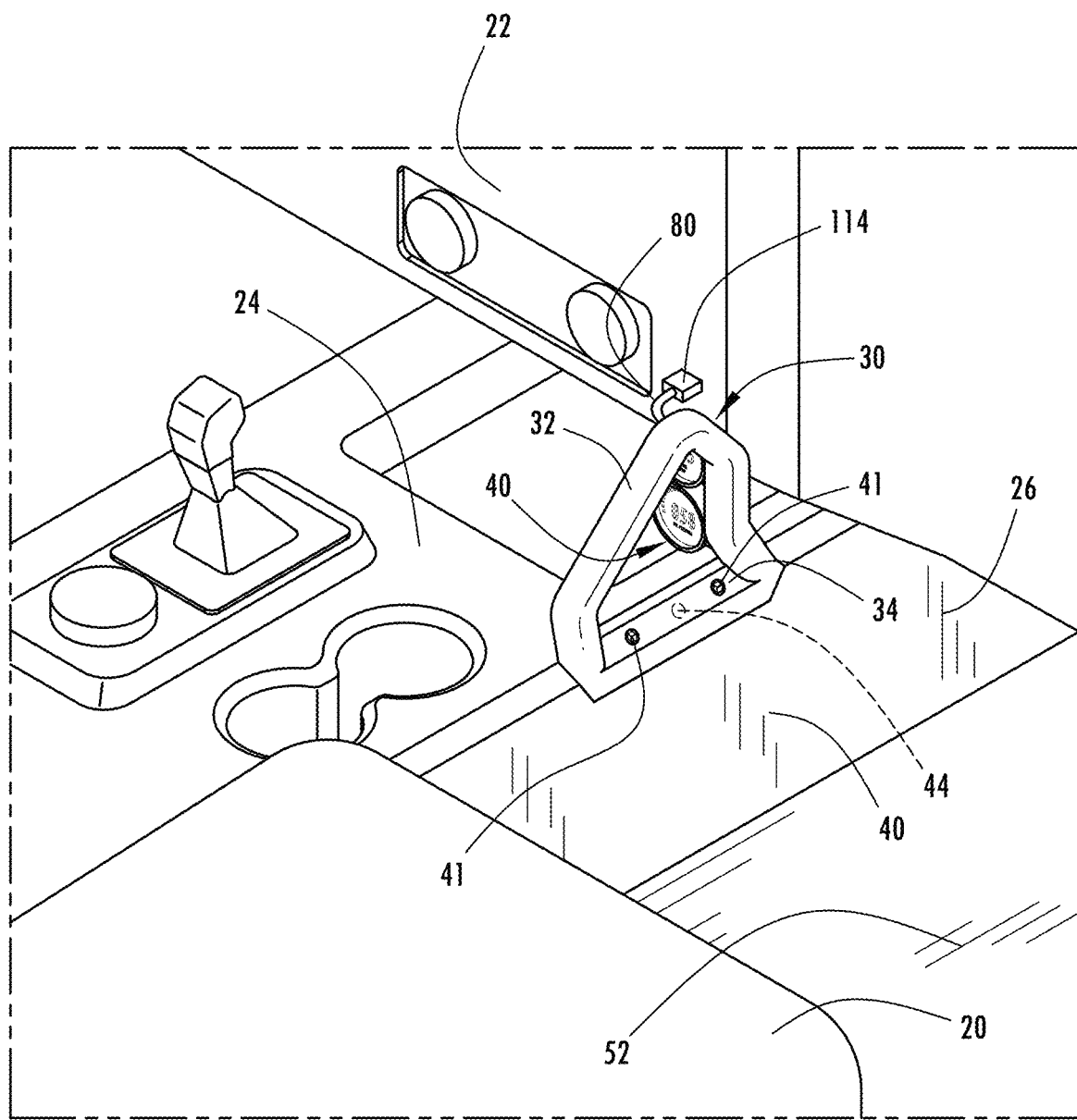
FIG. 2 is a right side perspective view of the interior of the vehicle illustrating an assist handle assembly having a display shown as two gauges and located near a center console of the vehicle, according to one embodiment.
Figure 3:
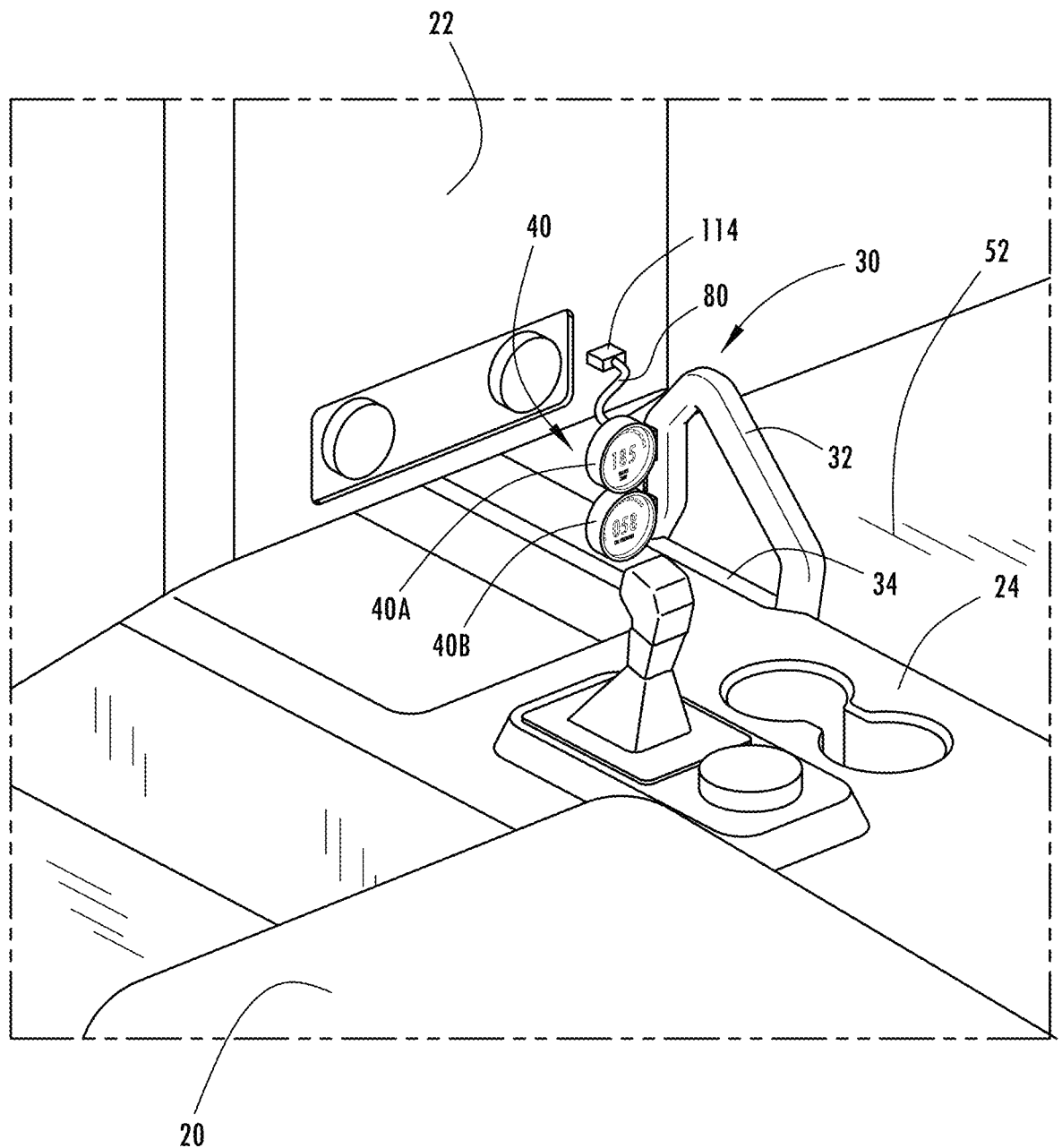
FIG. 3 is a left side perspective view of the assist handle assembly shown in FIG. 2.

Referring to FIGS. 2 and 3, the assist handle assembly 30 is shown assembled onto a passenger side of the center console 24 and positioned to enable a passenger seated on seat 20 to engage and grip the assist handle assembly 30 with a hand for support while entering the vehicle and while traveling in the vehicle 10. For example, when the vehicle 10 is traveling off-road on rough terrain, a passenger seated on the passenger seat 20 may grip the assist handle assembly 30 for purposes of maintaining balance and stability. While the assist handle assembly 30 is shown located on the passenger or right side of the center console 24, it should be appreciated that the assist handle assembly 30 may be located on the driver or left side of the center console 24, on the vehicle body side of a passenger seat, in the rear row of seating such as on a rear center console or at other locations within the vehicle 10.

The assist handle assembly 30 includes a handle base 34 that connects to the center console 24 and an assist handle 32 designed to receive and support a user's hand gripped thereto. The handle base 34 is connected to the center console 24 via an underlying bracket and fasteners 41 as shown and described herein. The assist handle assembly 30 serves both as an assist handle and a display for displaying information to the driver and/or passenger(s) in the vehicle 10.

Figure 4:
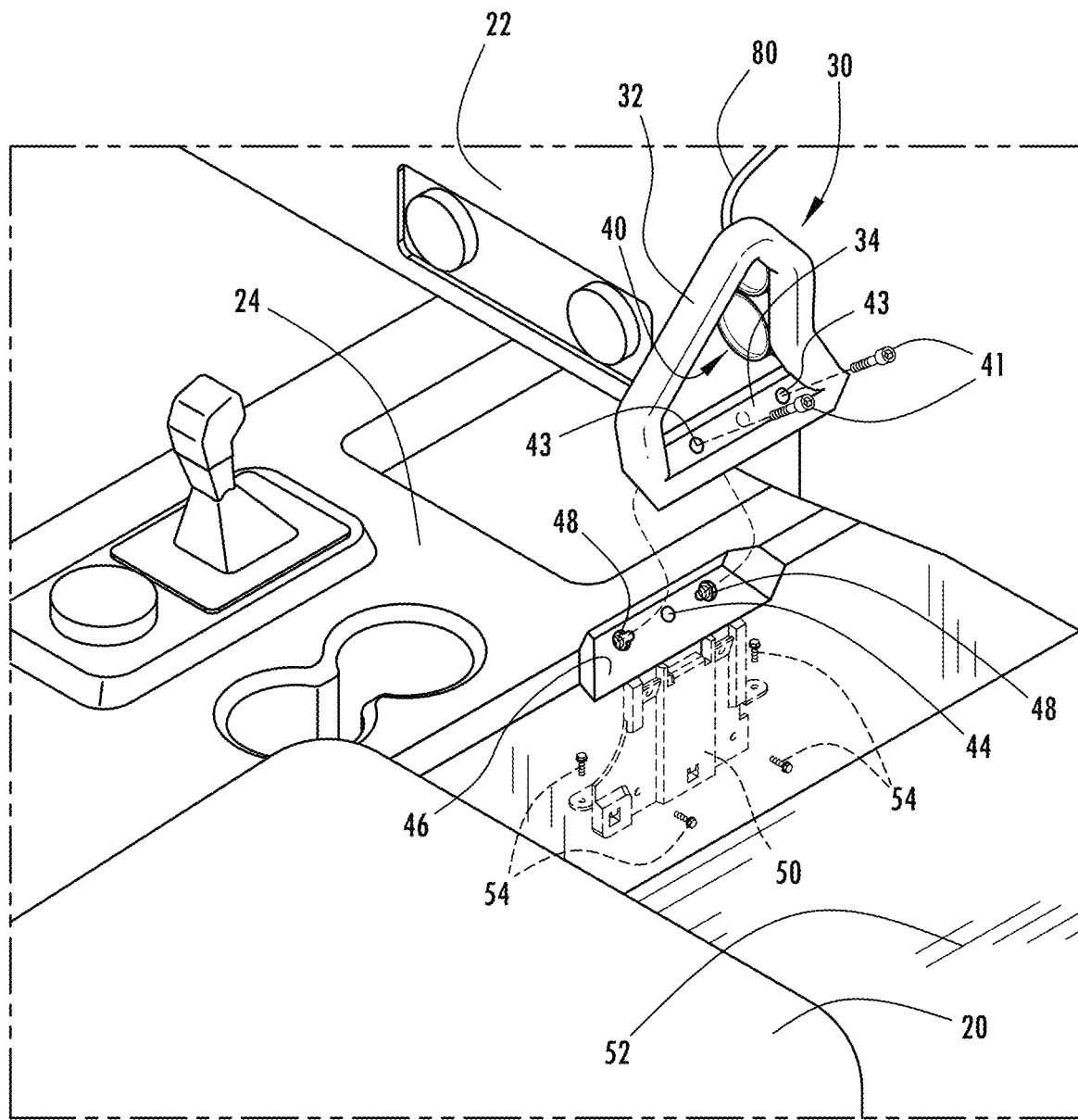
FIG. 4 is an exploded view of the assist handle assembly showing the mounting arrangement onto the center console of the vehicle.

The assist handle assembly 30 is shown in an unassembled state in FIG. 4 for mounting onto a bracket 50 in the center console 24. A pair of threaded fasteners, such as screws 41, extend through openings 43 within the handle base 34 and into threaded recesses 48 in the top plate 46 of bracket 50. The bracket 50 may, in turn, extend to a rigid support structure component such as a vehicle floor 52 where the bottom end of the bracket 50 may be fastened to the floor 52 via threaded fasteners 54. As such, the assist handle assembly 30 is rigidly attached onto the bracket 50 which is fixedly supported by a rigid floor structure component of the vehicle 10 to allow the assist handle to withstand forces experienced during normal use of the assist handle assembly 30.

Figure 5:
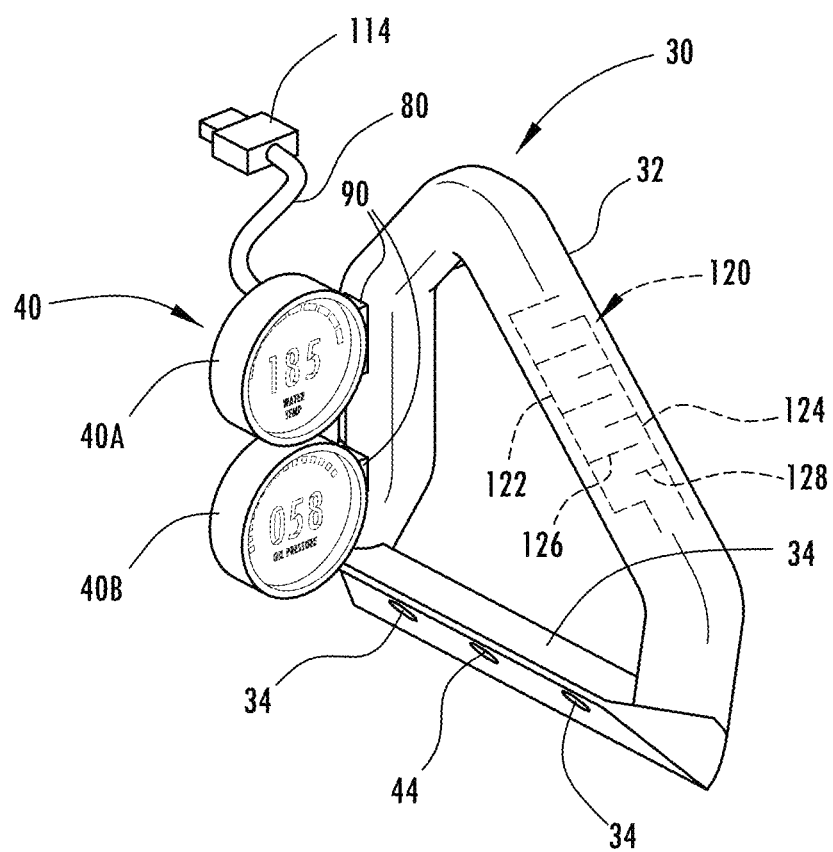
FIG. 5 is an enlarged left side perspective view of the assist handle assembly having the display shown with the pair of gauges.

The assist handle assembly 30 is illustrated in FIG. 5 having a display 40 which includes a first display gauge 40A and a second gauge display 40B, according to one embodiment. Each of gauge displays 40A and 40B are connected to the assist handle 32 by respective mounting plates 90, according to one example. The display 40 may include one or more gauge displays or display screens, according to various embodiments. The gauge displays 40A and 40B may be digital and/or analog gauge displays that display digital and/or analog data or information, for example. Each gauge display 40A and 40B may display information such as vehicle operating conditions or parameters. For example, gauge displays 40A and 40B may display sensed vehicle tilt angle and vehicle incline angle, particularly for off-road style vehicles. Gauge displays 40A and 40B may display other information such as transmission oil temperature, transfer case temperature, camera images, vehicle speed, vehicle engine RPM, fuel level, water temperature, oil pressure and other data which may be communicated from a vehicle controller to the display 40 using wireless or wired data communication.

The assist handle assembly 30 is further illustrated having a proximity sensor 120 located on the handle. One or more proximity sensors 120 may be employed on the assist handle 32. The one or more proximity sensors 120 may include one or more capacitive sensors that use capacitive sensing to sense an object, such as the hand of a user in close proximity to the assist handle 32. Each capacitive sensor may include a first electrode 122 having a first plurality of fingers 126 and a second electrode 124 having a second plurality of fingers 128. The first plurality of electrode fingers 126 may be interdigitated with the second plurality of electrode fingers 128.

The proximity sensor 120, when embodied as a capacitive sensor, may generate a sense activation field to sense contact or close proximity (e.g., within 3 mm) of a user in relation to the proximity sensor. The sense activation field of the proximity sensor 120 is a capacitive field in the exemplary embodiment and the user's hand has electrical conductivity and dielectric properties that cause a change or disturbance in the sense activation field as should be evident to those skilled in the art. However, it should be appreciated by those skilled in the art that additional or alternative types of proximity sensors can be used, such as, but not limited to, inductive sensors, optical sensors, temperature sensors, resistive sensors, the like, or a combination thereof. The proximity sensor 120 may be printed as a conductive ink onto a substrate such as an inner surface of a covering of the grab handle 132 or may be assembled as a preformed conductive circuit trace. One of the first and second electrodes 122 and 124 operates as a drive electrode and may receive square wave drive pulses applied at a voltage. The other of the first and second electrodes 122 and 124 operates as a receive electrode and has an output for generating an output voltage. It should be appreciated that the first and second electrodes 122 and 124 may be arranged in various other configurations for generating the capacitive field.

The capacitive sensor may sense contact or close proximity of an object, such as a user's hand, gripping the assist handle 32. This may allow for a controller in the vehicle to temporarily tighten or lock a seatbelt of a passenger when the assist handle 32 is fully grabbed by the passenger or when the grip on the assist handle tightens. Additionally, the proximity sensor 120 may detect engagement of the assist handle 32 by a person when the owner or potential passenger(s) are located remote from the vehicle, such as may be determined by a key fob or other sensor, and therefore may serve as a theft deterrent and/or may output a theft alarm. It should further be appreciated that one or more proximity sensors 120, such as capacitive sensors may likewise be employed in the assist handle 32. It should be appreciated that other features or devices may be controlled based on the output of the proximity sensor 120.

The assist handle assembly 30 further includes a power cable 80 for connecting to a vehicle power supply and ground to supply electrical power to the display 40 and capacitive sensor(s) 120. The power cable 80 may have a releasable connector 114 such as a plug-in-connector, e.g., USB connector or a cigarette lighter connector, for supplying electrical power supply and ground connection. A user may plug the power cable connector 114 into a power supply connector on the vehicle 10. The handle base 34 also includes an opening 44 to enable the power cable 80 to be extended through the opening 44 to allow a hidden electrical connection within the center console 24. This may be achieved by using a jumper harness as the power cable 80 to plug into power and ground and may also connect to a vehicle controller area network (CAN) bus on the vehicle 10 which may provide power and data communication between the vehicle 10 and the assist handle assembly 30 including the display 40.

Figure 6:
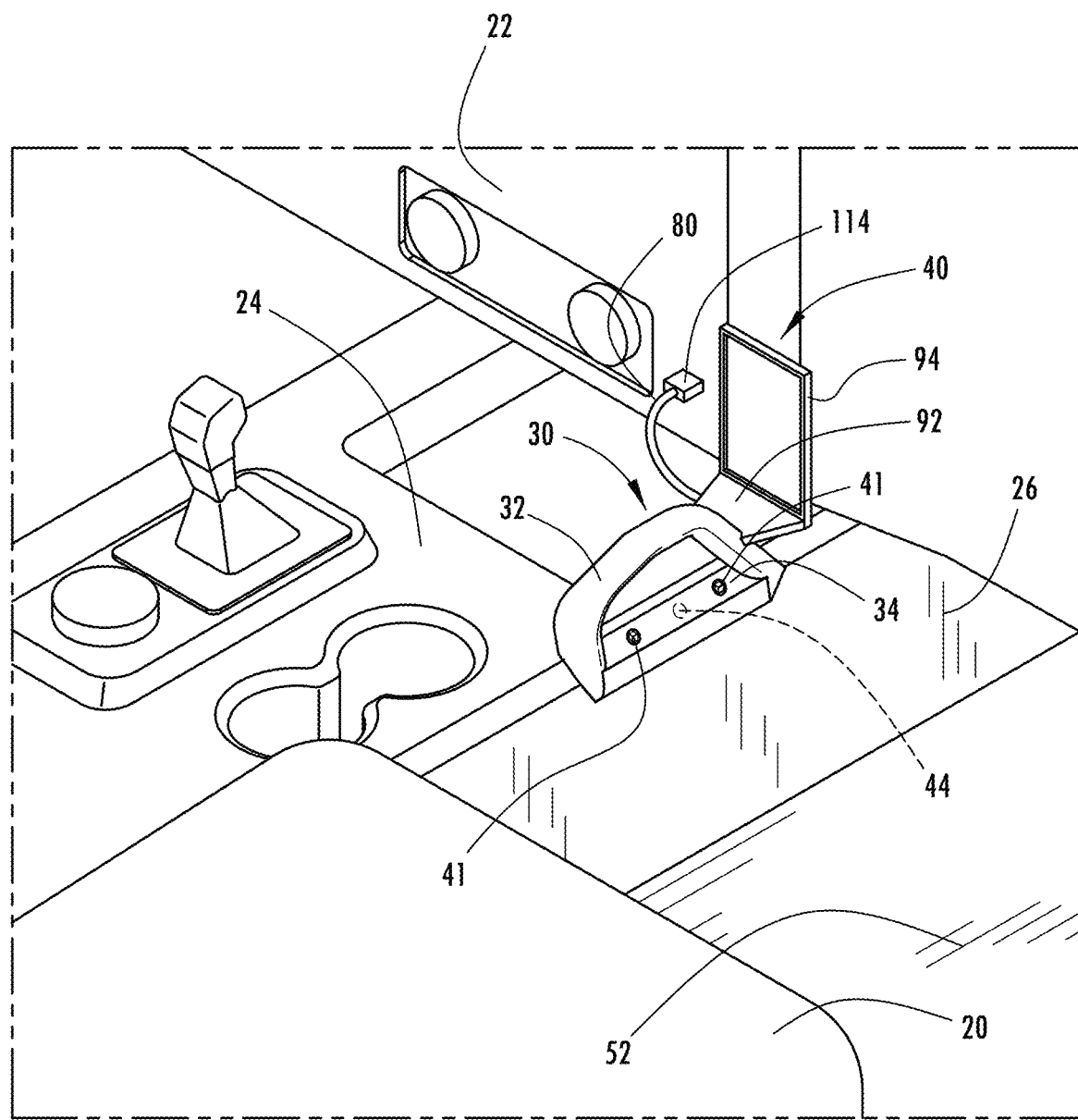
FIG. 6 is a right side perspective view of an assist handle assembly having a single display mounted to a center console of the vehicle, according to another embodiment.
Figure 7:
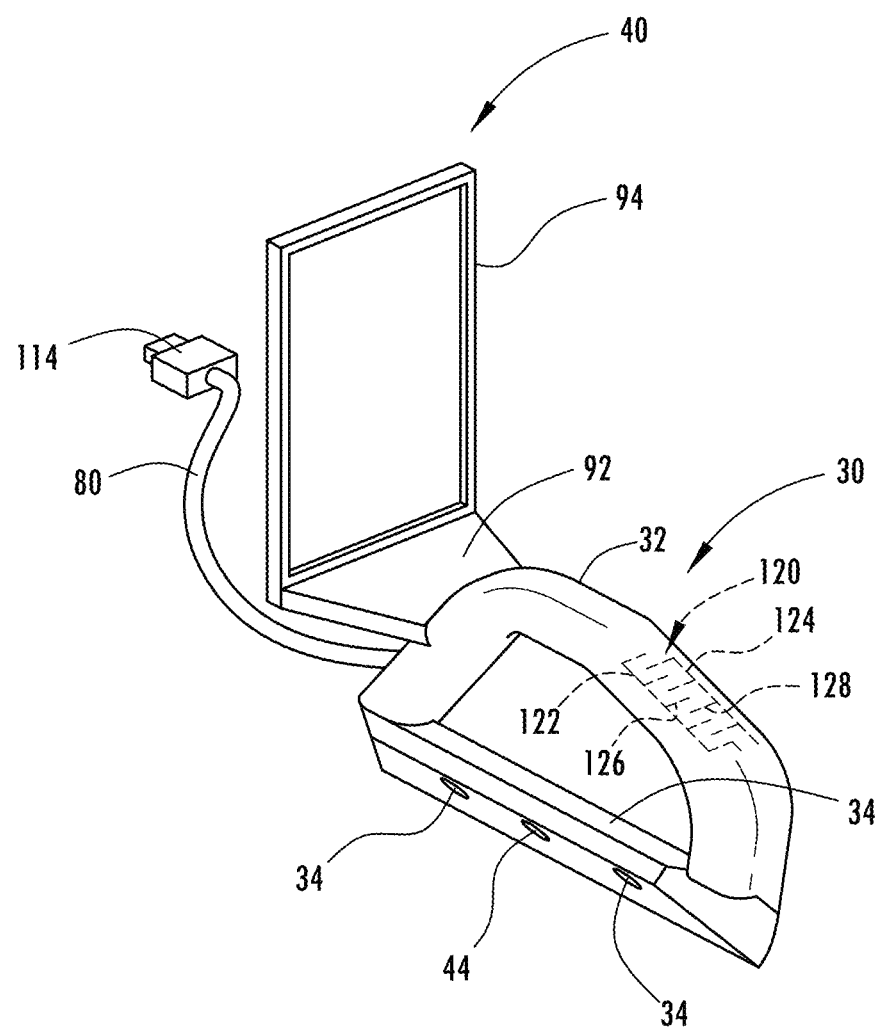
FIG. 7 is an enlarged left side perspective view of the assist handle assembly shown in FIG. 6.

Referring to FIGS. 6 and 7, an assist handle assembly 30 is illustrated having a display 40 in the form of a single flat touchscreen located forward of the assist handle 32, according to another embodiment. The display 40 may be a touch screen display having a generally flat panel display surface such as a liquid crystal display (LCD), for example. The display 40 is connected to the assist handle 32 via a mount 92 which is shown generally extending horizontally. The touchscreen display 40 may be viewable by a passenger or a driver of the vehicle seated on the left or right sides of the assist handle 32. The touchscreen display 40 may be framed with a polymeric material and integrally formed with the handle 32 or may be connected thereto via fasteners or connectors. The display 40 may display various operating conditions or parameters of the vehicle, sensor inputs, and video camera images such as acquired video images on the undercarriage of the vehicle 10, for example. It should be appreciated that the display 40 may include other types of displays other than gauge displays and flat screen displays, according to various other embodiments.

Figure 8:
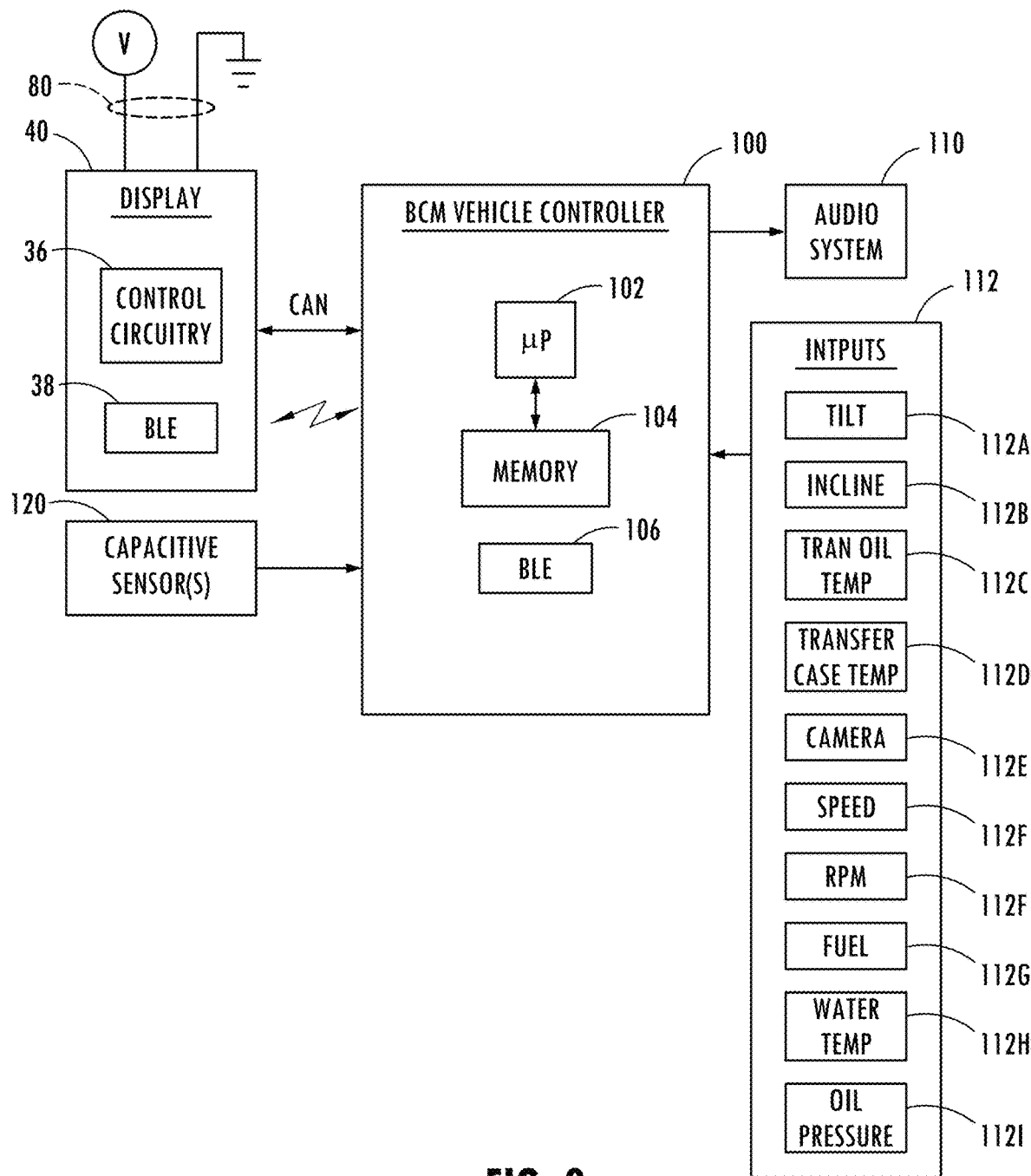
FIG. 8 is a block diagram illustrating communication of a vehicle controller with the display, according to one example.

Referring to FIG. 8, a vehicle controller 100, such as a body control module (BCM) may communicate with the display 40 to communicate data information between the vehicle and the display 40. The vehicle controller 100 includes microprocessor 102, memory 104 and wireless circuitry (BLE) 106. The vehicle controller 100 may communicate with the display 40 via wireless communication by communicating via the communication link 106 of the vehicle controller 100 with the wireless communication link 38 of the display 40, such as by using Bluetooth®. Additionally, or alternatively, the vehicle controller 100 may communicate with the display 40 via a wire connection, such as through a controller area network (CAN) bus of the vehicle 10. The display 40 is shown receiving power via power cable 80 which includes the battery supply voltage V and ground and the communication links may communicate via either wired or wireless communication.

The vehicle controller 100 receives various inputs including an input from the capacitive sensor(s) 120 and receives various inputs 112. The various inputs 112 may include vehicle operating conditions or sensed signals, such as vehicle tilt angle 112A, vehicle incline angle 112B, transmission oil temperature 112C, transfer case temperature 112D, camera image signals 112E, vehicle speed signals 112F, engine RPMs 112F, vehicle fuel level 112G, water temperature 112, and oil pressure 112I, according to various examples. These and other inputs and data may be received and processed by the vehicle controller which may then provide outputs to the display 40 and to one or more vehicle human machine interface (HMI) system such as the audio system 110.

The display 40 may communicate data via wireless communication with the vehicle controller 100. According to one embodiment, the display 40 has wireless communication link circuitry 42, such as Bluetooth® (BLE) that may communicate with wireless communication link circuitry 106 (BLE) of the vehicle controller 100. The vehicle controller 100 may include control circuitry, such as a microprocessor 102 and memory 104. The vehicle controller 100 may communicate with the display 40 and may communicate with various other devices and components of the vehicle 10.

Accordingly, the assist handle assembly 30 advantageously provides for an assist handle with a display 40 configured to display information to a passenger in the vehicle. It should be appreciated that the assist handle 32 may be integrally formed with the display 40, according to one embodiment. In other embodiments, the display 40 may be attached onto the assist handle 32 to provide an assembled unit as the assist handle assembly 30.

It should be appreciated that the assist handle assembly 30 may be located at one or more other locations on the vehicle 10, such as on the dashboard, a door side of the vehicle, a pillar and elsewhere on the vehicle 10. The assist handle assembly 30 may be an add-on assembly that can be assembled onto the vehicle 10 by a user with the releasable connectors, e.g., fasteners that allow for easy assembly and disassembly from the vehicle 10. The assist handle assembly 30 may thereby replace another assembly such as an assist handle that does not have any accessories, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assist handle assembly for an interior cabin of a vehicle, the assist handle assembly comprising:
an assist handle configured to be gripped by a user, wherein the assist handle is a non-driving handle;
a display connected to the assist handle and configured to display operating conditions or parameters of the vehicle including at least a tilt or incline angle of the vehicle, wherein the display comprises at least one of a screen display and a gauge display;
a connector configured to secure the assist handle assembly to a structural component in the interior cabin of the vehicle; and
a communication link configured to communicate with a controller onboard the vehicle, wherein the display displays at least one of a vehicle operating condition, a vehicle parameter and images acquired on the vehicle and communicated via the communication link.

2. The assist handle assembly of claim 1, wherein the connector is releasable to allow for assembly and disassembly of the assist handle assembly from the vehicle.

3. The assist handle assembly of claim 2 further comprising a power cable for connecting to a vehicle power supply.

4. The assist handle assembly of claim 1, wherein the display comprises a touchscreen display.

5. The assist handle assembly of claim 1, wherein the display comprises a gauge display.

6. The assist handle assembly of claim 1, wherein the communication link comprises a wireless communication link.

7. The assist handle assembly of claim 1, wherein the display extends vehicle forward of the assist handle when installed on the vehicle.

8. The assist handle assembly of claim 1, wherein the connector is configured to connect to a bracket in an interior portion of the vehicle.

9. The assist handle assembly of claim 1, wherein the assist handle comprises one or more proximity sensors.

10. The assist handle assembly of claim 9, wherein the one or more proximity sensors comprises one or more capacitive sensors.

11. An assist handle assembly for use in an interior cabin of a vehicle, the assist handle assembly comprising:
an assist handle configured to be gripped by a user, wherein the assist handle is a non-driving handle;
a display connected to the assist handle and configured to display operating conditions or parameters of the vehicle including at least a tilt or incline angle of the vehicle, wherein the display comprises at least one of a touch screen display and a gauge display;
a communication link operatively coupled to the display, wherein the communication link is configured to communicate with a controller onboard the vehicle, wherein the display displays at least one of a vehicle operating condition, a vehicle parameter and images acquired on the vehicle and communicated via the communication link; and
a connector configured to secure the assist handle assembly to a structural component in the interior cabin of the vehicle.

12. The assist handle assembly of claim 11, wherein the connector is releasable to allow for assembly and disassembly of the assist handle assembly to the vehicle.

13. The assist handle assembly of claim 12 further comprising a jumper harness for releasably connecting to a vehicle power supply.

14. The assist handle assembly of claim 11, wherein the display comprises a touchscreen display.

15. The assist handle assembly of claim 11, wherein the display comprises a gauge display.

16. The assist handle assembly of claim 11, wherein the communication link comprises a wireless communication link.

17. The assist handle assembly of claim 11, wherein the assist handle further comprises one or more proximity sensors.

* * * * *